Feb. 26, 1957 C. F. HAUG 2,783,155
NOVELTIES
Filed Oct. 15, 1953
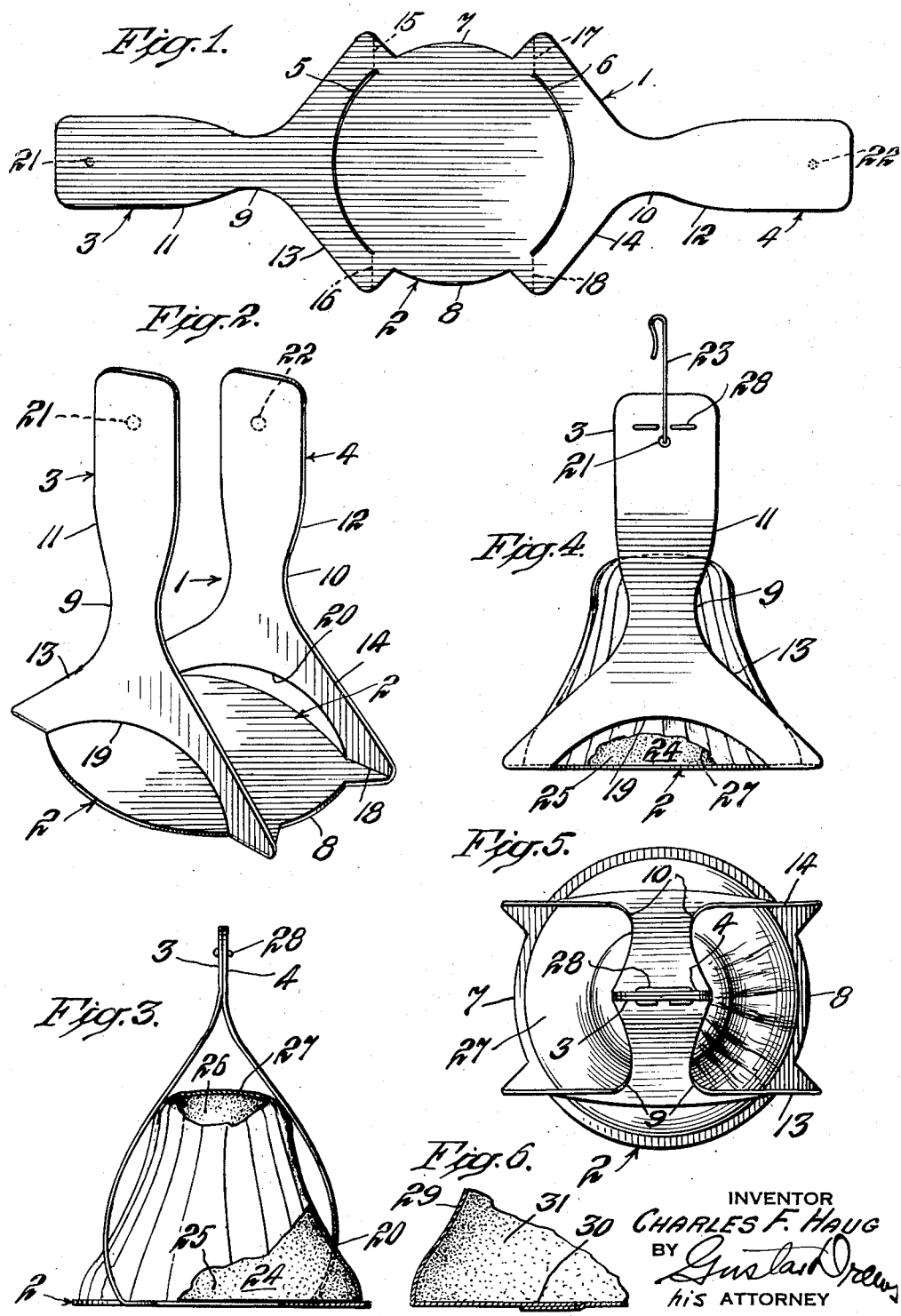
INVENTOR
CHARLES F. HAUG
BY Gustav Drew
his ATTORNEY

United States Patent Office 2,783,155
Patented Feb. 26, 1957

2,783,155
NOVELTIES

Charles F. Haug, Manhasset, N. Y., assignor to Mason, Au & Magenheimer Conf. Mfg. Co., Mineola, N. Y., a corporation of New York Application October 15, 1953, Serial No. 386,341

1 Claim. (Cl. 99—180)

This invention relates to novelties in general, and especially those adapted for Christmas tree ornaments and the like.

Among the objects of the present invention, it is aimed to provide a novel stirrup composed of paper or the like inexpensive sheet material having a platform, two pendants extending from said platform and having openings at the intersection of the pendants and the platform in the form of incisions which will produce wide windows when the pendants are bent upward relative to the platform, in which case a candy or the like conforming to the shape of the platform may rest on the platform and extend through the windows to be anchored by the pendants against accidental removal from the platform, the upper ends of which pendants may be connected to one another by any suitable means and in turn connected to a wire clip to be secured to a Christmas tree branch or the like.

It is still another object of the present invention to provide a novelty consisting of a stirrup, a candy having a wide base, and a wrap for the sides and top of the candy, the stirrup being composed of paper or the like inexpensive sheet material having a platform, two pendants extending from said platform and having incisions at the intersection of the pendant and the platform which will spread out into wide openings when the pendants are bent at an angle to the platform, the base of the candy conforming in size and shape to the platform, the wrap preferably composed of tin foil or the like which is wrapped down into clinging engagement with the top and sides of the candy down to the base supplementing the base as a complete closure for the candy, the base of the candy after being wrapped extending through the openings formed between the platform and the pendants when the pendants are bent away from the platform alongside of the wrapped candy and the free ends of the pendants extending beyond the wrapped candy and secured to one another effectively to anchor the candy on the platform in the stirrup against accidental removal from the same.

These and other features, capabilities and advantages of the invention will appear from the subjoined detailed description of two specific embodiments thereof illustrated in the accompanying drawings, in which:

Fig. 1 is a plan view of the stirrup stretched out.

Fig. 2 is a perspective of the stirrup with the pendants bent upwardly relative to the platform.

Fig. 3 is an end elevation of the stirrup with a wrapped candy supported in the same.

Fig. 4 is a side elevation showing a wire clip secured to the free ends of the pendants.

Fig. 5 is a plan view of the assembly illustrated in Fig. 3.

Fig. 6 is a fragmental section of a part of another embodiment.

In the embodiment shown, the stirrup 1 composed of paper or the like inexpensive sheet material consists of a platform or base 2 substantially circular in outline from which extend the two pendants 3 and 4 defined from the platform 2 by the outwardly bulging one line arcuate incisions 5 and 6 supplementing the arcuate edges 7 and 8 of the platform 2 to simulate a substantially circular outline for the platform 2. The two pendants 3 and 4 in the present instance have narrow neck portions 9 and 10 between the broad main portions 11 and 12 on the one hand and the claw-shaped base portions 13 and 14, respectively.

When the pendant 3 is bent along the dotted lines 15 and 16 and the pendant 4 is bent along the dotted lines 17 and 18, see Fig. 2, the incisions 5 and 6 will permit the formation of the wide windows 19 and 20 between the pendants 3 and 4 and the platform 2 and enable the free end portions of the pendants to engage one another face to face. Preferably the free end portions of the pendants 3 and 4 have weakened circular openings 21 and 22 to enable puncturing the same by a wire clip 23 such as illustrated in Fig. 4. The platform 2 serves not only to support a candy 24, see Fig. 3, or the like, but also may serve as indicated to form the base closure or base wrap for the candy 24.

Preferably the stirrup 1 is used with a bell-shaped candy 24, such as illustrated, having a wide base portion 25 terminating at its upper end in a comparatively narrow end 26. When so formed, and the base 25 conforms in outline to the outline of the platform 2, then after the candy 24 is placed upon the platform 2 in the process of manufacture, the platform 2 will not only serve as a supporting base for the candy but as a wrap for the lower face of the candy which may supplement a wrap 27 composed of foil or the like clinging sheet material which can be wrapped down from the top 26 into clinging engagement with the sides of the candy 24, or else a foil wrap die-pressed to assimilate the outer contour of the candy 24, such as the die-pressed wrap 27.

Preferably the free ends of the pendants 3 and 4 are secured to one another by any suitable means, such as adhesive, staples, or the like. In the present instance, see Figs. 3, 4 and 5, a staple 28 is illustrated as securing the free ends of the pendants to one another.

In turn, the staple 28 may be secured to the free ends of the pendants 3 and 4 either before or after the candy unit 24 is placed on the platform 2. Still furthermore, the pendants 3 and 4 have sufficient flexibility so that the candy unit 24 and its wrap 27 may be removed, after the staple 28 has been secured in place, whether or not the article is suspended by means of the wire clip 25 from a Christmas tree or the like, the candy unit 24 in turn removed from the wrap 27 for consumption as an instance, and the wrap 27 then replaced without the candy unit 24 on the platform 2 to continue to serve as an ornament.

Obviously, if the wrap 27 is composed of foil, whether it is die-pressed before being placed on the candy unit 24 or manually wrapped around the candy unit 24, the foil will have sufficient rigidity to retain its shape and permit its being placed on the platform 2 without enclosing the candy unit 24.

Finally, however, the candy unit 24 may of course be completely wrapped, that is, the wrap such as the wrap 29 shown in Fig. 6, wrapped around the base 30 as well as the sides of the candy unit 31 before being placed on the platform 2 to satisfy the food regulations of certain States in the Union which require that all food items be entirely enclosed before being offered for sale to the consumer.

It is obvious that various changes and modifications may be made to the details of construction without departing from the general spirit of the invention as set forth in the appended claim.

I claim:

The combination of a bell-shaped candy unit having a circular protruding circular base portion and a diminishing upper end portion, with a stirrup composed of a flexible sheet material having a base conforming substantially in contour to the outer periphery of the protruding base portion of said candy unit, two pendants extending from opposite sides of said base, there being outwardly bulging one line arcuate incisions defining a part of the contour of the base and a part of the division between said pendants and said base, said incisions forming wide openings when said pendants are bent upwardly relative to said base to envelope a part of said candy unit and enable parts of the base portion of the candy to protrude between the pendants and the base of the stirrup, and means for connecting the free end portions of said pendants to one another face to face when so bent and to cooperate with the openings through which the base portion of said candy unit extends to anchor said candy unit in place in the stirrup.

References Cited in the file of this patent

UNITED STATES PATENTS

| Number | Name | Date |
|---|---|---|
| 312,761 | Reinhardt | Feb. 24, 1885 |
| 354,509 | Grimm | Dec. 14, 1886 |
| 516,907 | Barker | Mar. 20, 1894 |
| 1,569,747 | Haug | Jan. 12, 1926 |
| 1,613,282 | Mayhew | Jan. 4, 1927 |
| 1,640,452 | Knowlton | Aug. 30, 1927 |
| 1,913,134 | Tilney | June 6, 1933 |
| 2,258,716 | Ralph et al. | Oct. 14, 1941 |
| 2,513,762 | Tyson | July 4, 1950 |
| 2,567,054 | Clement et al. | Sept. 4, 1951 |
| 2,602,543 | Teufel | July 8, 1952 |
| 2,676,748 | Sprenger et al. | Apr. 27, 1954 |